United States Patent
Smith

(10) Patent No.: US 6,589,097 B2
(45) Date of Patent: Jul. 8, 2003

(54) BICYCLE MOUNTED NOISE-MAKING DEVICE

(76) Inventor: Terry Smith, P.O. Box 4146, Tustin, CA (US) 92780

(*) Notice: Subject to any disclaimer, the term of this patent is extended or adjusted under 35 U.S.C. 154(b) by 80 days.

(21) Appl. No.: 10/061,733

(22) Filed: Oct. 25, 2001

(65) Prior Publication Data
US 2002/0081938 A1 Jun. 27, 2002

Related U.S. Application Data

(63) Continuation-in-part of application No. 09/538,929, filed on Mar. 31, 2000, now Pat. No. 6,394,875.

(51) Int. Cl.[7] ................................. A63H 5/00
(52) U.S. Cl. ................. 446/404; 446/397; 280/288.4
(58) Field of Search ...................... 446/404, 397, 446/421, 420, 418, 405, 409, 413; 280/828, 1.14, 288.4

(56) References Cited

U.S. PATENT DOCUMENTS

| | | | | | |
|---|---|---|---|---|---|
| 2,367,430 A | * | 1/1945 | Redlund | .................. | 280/288.4 |
| 2,603,035 A | * | 7/1952 | Countryman et al. | ....... | 446/404 |
| 2,620,764 A | * | 12/1952 | Cook | ................... | 4280/288.4 |
| 2,719,385 A | * | 10/1955 | Wilson | .................. | 280/288.21 |
| 2,987,850 A | * | 6/1961 | Bergland | ................. | 280/288.4 |
| 3,003,280 A | * | 10/1961 | Gordon | .................... | 280/288.4 |
| 3,071,894 A | * | 1/1963 | Frye | ......................... | 280/288.4 |
| 3,097,447 A | * | 7/1963 | Peham et al. | ............ | 280/288.4 |
| 3,121,293 A | * | 2/1964 | Sperry et al. | ................ | 446/404 |
| 3,267,606 A | * | 8/1966 | Forbis et al. | .......... | 280/288.21 |
| 3,289,348 A | * | 12/1966 | Terry | ....................... | 280/288.4 |
| 3,559,333 A | * | 2/1971 | Manzo | ........................ | 446/404 |
| 3,754,350 A | * | 8/1973 | Gorke | ......................... | 446/404 |
| 3,905,151 A | * | 9/1975 | Zweigle | ...................... | 446/404 |
| 4,151,677 A | * | 5/1979 | Tucker | ....................... | 446/404 |
| 4,735,592 A | * | 4/1988 | Griffin | ........................ | 446/404 |
| 4,875,885 A | * | 10/1989 | Johnson | ...................... | 446/404 |
| 5,306,197 A | * | 4/1994 | Watanabe | .................... | 446/409 |
| 5,314,372 A | * | 5/1994 | Kramer | ....................... | 446/404 |
| 5,367,939 A | * | 11/1994 | Barker | ........................ | 446/421 |
| 5,611,558 A | * | 3/1997 | Randmae | ..................... | 446/404 |
| 6,394,875 B1 | * | 5/2002 | Smith | ....................... | 280/288.4 |

FOREIGN PATENT DOCUMENTS

GB    2299199 A   *   9/1996   ............ A63H/5/00

* cited by examiner

Primary Examiner—Derris H. Banks
Assistant Examiner—Urszula M Cegielnik
(74) Attorney, Agent, or Firm—Steins & Associates, P.C.

(57) ABSTRACT

A sound-making device for attachment to bicycle wheels is presented which includes a flared, horn-shaped tube, a flexible contact member and a universal mounting device for connecting the invention to a bicycle. The horn-shaped tube is specifically designed to eliminate destructive interference of sound waves generated by the flexible contact. The flexible contact is designed to be easily replaceable, even by a child.

10 Claims, 6 Drawing Sheets

BICYCLE MOUNTED NOISE-MAKING DEVICE

This application is a continuation-in-part of application Ser. No. 09/538,929, filed Mar. 31, 2000 now U.S. Pat. No. 6,394,875.

BACKGROUND OF THE INVENTION

1. Field of the Invention

This invention is a device for children's bicycles which resembles a motorcycle exhaust pipe in appearance and imitates or emulates the sound of a motorcycle engine.

2. Brief Summary of the Prior Art

There are several known devices for emulating the sound of a combustion engine, including U.S. Pat. Nos. 2,620,764; 3,210,889 and 3,439,926. These devices propose constructions with side plates having a plastic finger/contact mount on them. The whole plate is usually mounted on the bicycle frame directly and the plastic contact interferes with the travel of the bicycle wheel spokes to make the repetitive noise vibrations. These devices did not concentrate or direct the noise created by the vibrating contact and allowed said noise vibrations to dissipate into the surrounding air.

More recently, U.S. Pat. No. 4,151,677 by Tucker (May 1, 1979) teaches an adjustable noisemaker with contact arms of varying length, thickness and width. The arms can be selected by the user to determine the kind and volume of noise produced. The body of the noisemaker is a fanciful design, resembling a jet engine housing; the body has no perceptible acoustic function. Contact arms cannot be replaced.

U.S. Pat. No. 4,737,592 by Griffin (Apr. 5, 1988) proposes a conical hollow member attached to the frame of the bicycle, which conical member retains a vibrating arm inserted into the spokes of the bicycle. The conical member concentrates, directs, and amplifies the sound vibrations from the contact arm.

Each of the two most-recently patented devices can be attached to the horizontal bicycle frame in any conventional manner.

SUMMARY OF THE INVENTION

This noise-making device (hereafter "bike pipe") is shaped like the exhaust tailpipe of a motorcycle. The bike pipe is mounted on the uprising rear wheel support of a child's bicycle frame. When the bicycle is pedaled the bike pipe emits a loud sound similar to that of a running motorcycle engine.

The bike pipe has four (4) basic parts:

1. A hollow horn-shaped pipe.
2. A rotatable cap.
3. A replaceable flexible spoke contact.

The bike pipe possesses a universal mount that ensures quick, simple, proper mounting of the device on all children's bicycles, requiring nothing more than a wrench to remove and replace the rear wheel axle nut.

When attached to a bicycle, the pipe extends up and away to the rear wheel at a right angle to the direction of travel of the spokes. When the wheel rotates, the spokes one by one pick up the flexible contact, carry it to the limit of its travel path and drops it, causing a loud roaring vibration to travel down the length of the pipe and up behind the moving bicycle where it can be easily heard by the child riding the bicycle. The vibrations emanating from the pipe are aimed generally upwards making it difficult to detect once the bicycle has traveled a short distance away.

Previous designs of similar bicycle noise-making devices have set the spoke-engaging member halfway down a pipe parallel to the long axis of the pipe. These configurations are inferior to the bike pipe because they broadcast half of the vibrations from the spoke contact down and out of the pipe and the other half up to a closed end where they reflect back toward the spoke engaging member. The reflected vibrations have a tendency to destructively interfere with and cancel new vibrations, especially the more desirable lower frequencies.

The bike pipe design with the flexible spoke contact set inside the cap on the forward end of the pipe perpendicular to the long axis of the pipe allows all the vibration to be broadcast down and out of the pipe and eliminates any destructive interference with low-frequency vibration.

The spoke contact is held in place by the cap snapping onto the pipe. This assembly is efficient and unique. There may also be a adjustable tuning bolt inserted into the cap for changing the pitch of the vibrations of the spoke contact. By tightening or loosening the tuning bolt, the tone of the vibrations can be changed from the low compression tone of a Harley Davidson to the higher smoother pitch of the popular four cylinder Japanese motorcycles. The cap rotates 90 degrees to the left or right depending on which side of the bicycle the device is mounted on, allowing the device to be turned on or off.

The bike pipe design is far superior to the previous art bicycle noisemakers that resemble an exhaust pipe and mimic the sound of an engine. The bike pipe sound is louder to the child riding the bicycle yet barely audible 100 feet away, reducing neighborhood noise pollution. It is much simpler to attach. It can be turned on and off by merely pushing or pulling a lever. Its tone can be adjusted by tightening or loosening a tuning bolt. The spoke contact is cheap and very easily replaced, even by a child.

An object of the present invention is to provide a simulated motorcycle exhaust pipe device attachable to a child's bicycle that simulates or emulates the sound of a motorcycle engine exhaust. This device will be easily attachable and detachable to/from the bicycle frame.

Another object of this invention is to provide a low-cost spoke-engaging contact member that can be easily replaced, even by a child.

Another object of the invention is to provide an acoustically efficient housing for the device which concentrates the sound made by the device and minimizes internal sonic interference in the housing.

A further object of the invention is to provide a device that will engage the rotating bicycle wheel spokes nearer the hub of the wheel, decreasing stress on the spokes at the rim end or in the middle, preventing the spokes from loosening at the attachments or suffering metal fatigue.

A further object of this invention is to minimize the interference with the pedaling foot of the bicycle rider by permitting placement of the device behind the hub of the rear wheel.

A further object of this invention is to provide a practical mounting device for the invention, suitable for attachment to the frame of any bike with any tube size frame.

A further object of this invention is to make the device such that it can be turned off (disengaged) without dismantling the entire device.

BRIEF DESCRIPTION OF THE DRAWINGS

The drawings provided can be understood by reading the accompanying description for at least one embodiment of the invention.

DETAILED DESCRIPTION OF THE PREFERRED EMBODIMENTS

Figure 2:
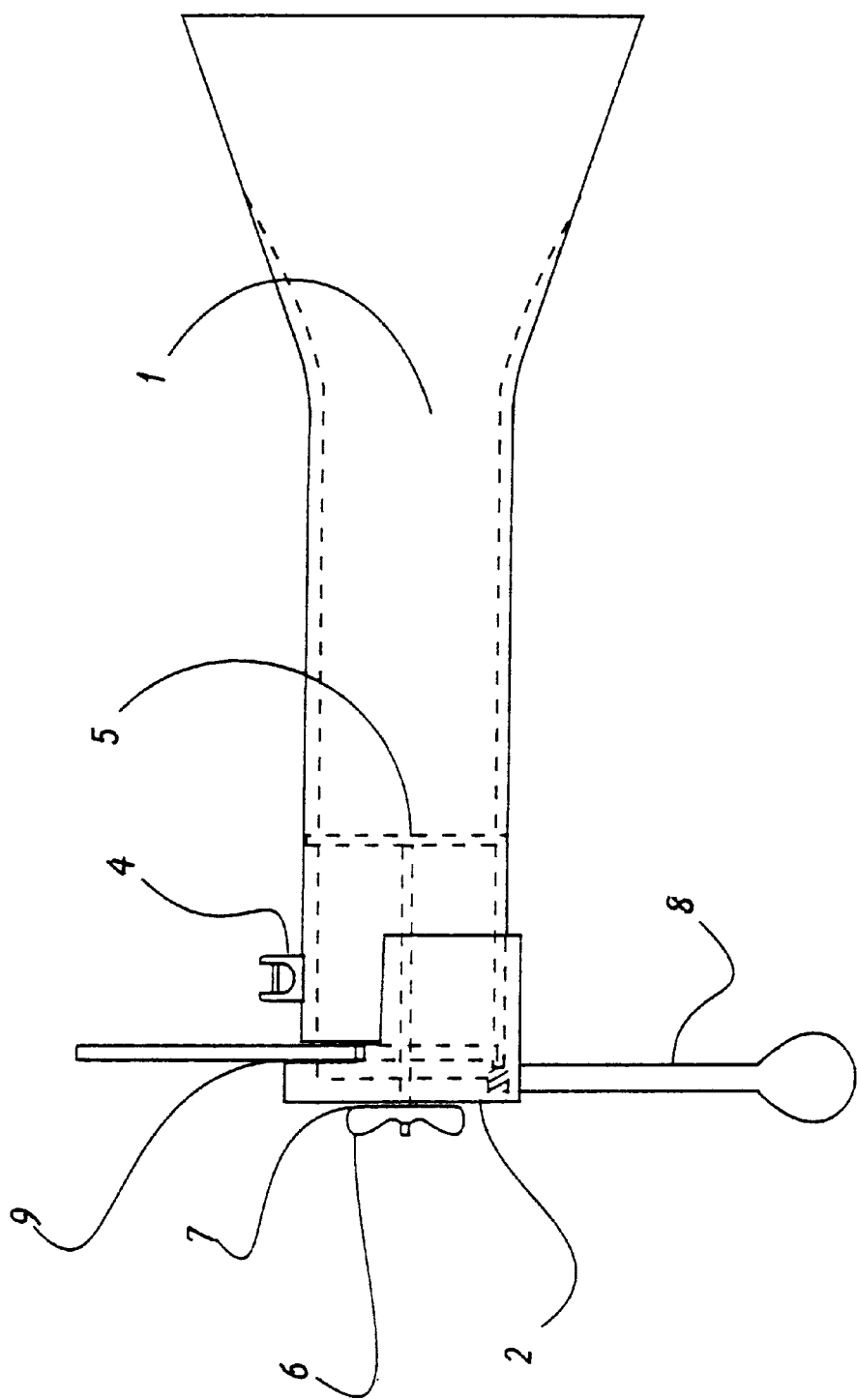
FIG. 2 is a partially cutaway side view of the device of FIG. 1, depicting the assembled device.

Referring to FIG. 2, the main body of the device is indicated by 1, referred to as the pipe, a hollow, flared tube designed to reduce sonic backwash and interference. The pipe 1 will be made of plastic or other acceptable material to minimize cost and weight. Attached to the pipe 1 is the pipe mount 4, made of metal or plastic, attached to the pipe 1 at the two indicated mounting bracket holes. The narrower end of the pipe is covered with a plastic cap 2, as shown assembled in FIG. 2 and disassembled in FIG. 3.

In this embodiment, the cap to pipe assembly T-bolt 5, (see FIG. 3) is fixedly attached to the interior of the pipe 1, and the screw-threaded end section of it passes through the center of the contact reed 3. The cap 2 fits over the narrow end of the pipe in a sliding fashion, being in interior diameter slightly larger than the outside diameter of the horn, and is fitted over the screw-thread end of the T-bolt 5.

An opening in the side of the cap permits the reed to extend outside the diameter of the pipe and come into contact with the bicycle spokes. A washer 7 fits over the screw thread end of the T-bolt after it has passed through the center of the cap 2, and a wing nut 6, screwedly engages the T-bolt threaded end and can be tightened down over the washer to hold the cap 2 onto a pipe 1. An on/off position control handle 8 is inserted into the side of the cap 2 and permits the cap 2 to be rotated about the center axis of the pipe, turning the reed into or away from the path of the bicycle spokes. An air gap 9, between the cap 2 and reed 3 allows the reed 3 to vibrate against the mouth of the pipe 1. An inside lip 10 of the cap 2 forces the reed 3 against the mouth of the pipe 1.

The pipe is attached to the bicycle frame by means of the mount 4, which places the cap 2 and reed 3 such that the cap 2 and reed 3 can be rotated by means of the on/off position control handle 8 to bring the reed 3 into contact with the turning spokes of the bicycle wheel. The sound produced by the reed 3 can be moderated or turned off by moving the control handle such that the reed 3 is rotated farther away from the spokes or completely out of the path of the spokes.

Figure 3:
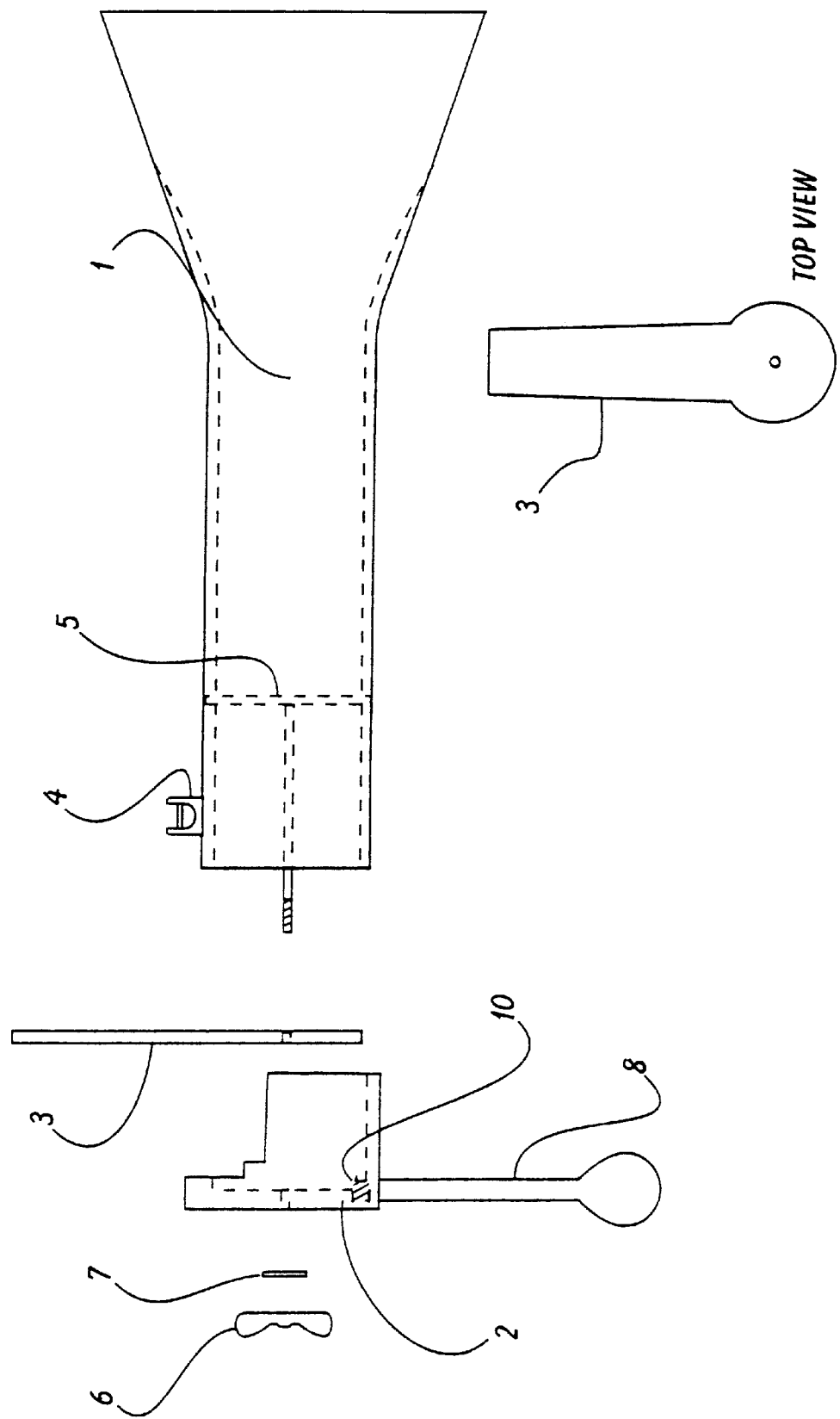
FIG. 3 is a partially cutaway exploded side view of the device if FIGS. 1 and 2.
Figure 4:
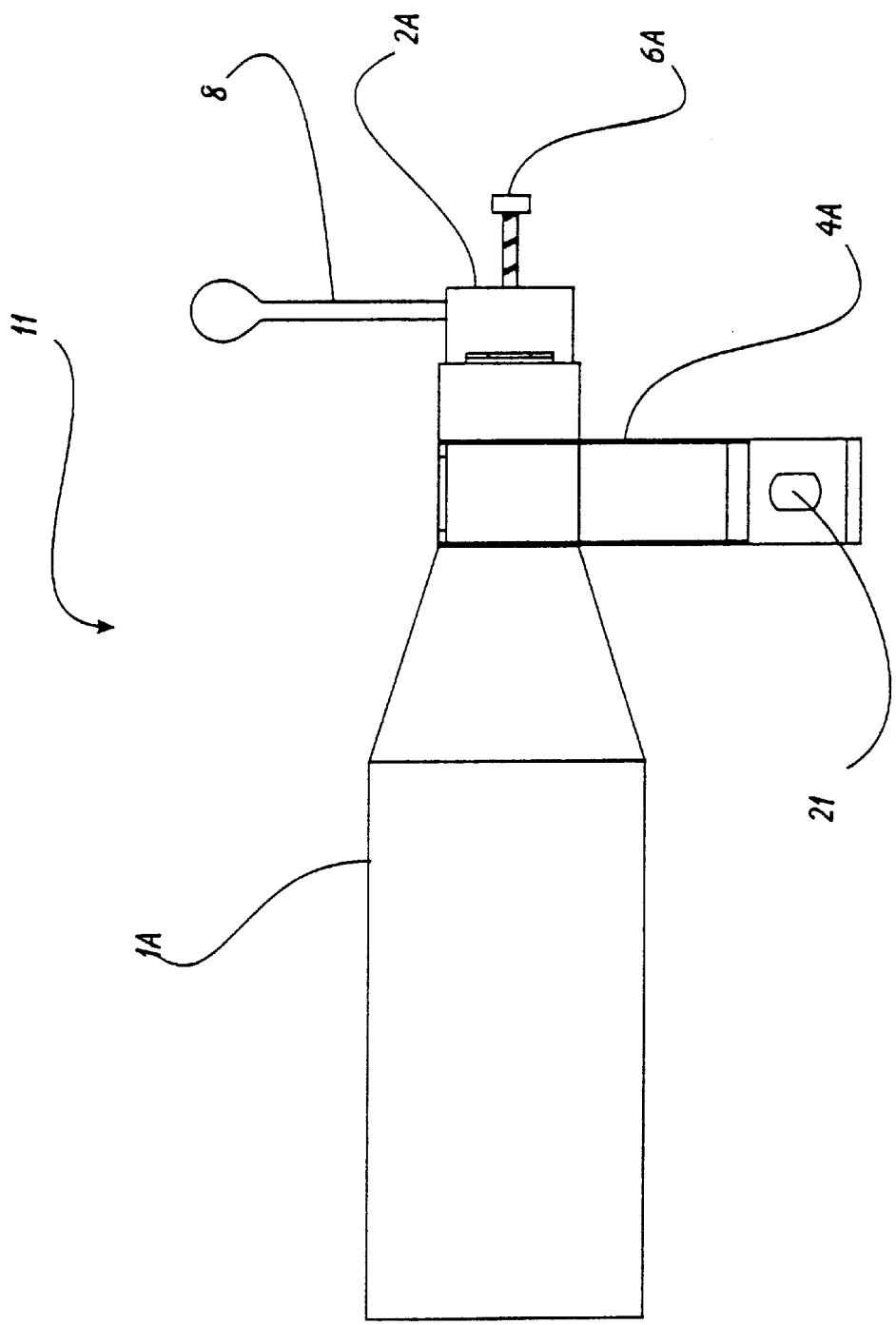
FIG. 4 is a side view of an alternate preferred design of the noise-making device of the present invention.

If we now turn to FIG. 4, we can examine yet another preferred embodiment of the device of the present invention. FIG. 4 is a side view of an alternate preferred design of the noise-making device 11 of the present invention. In this embodiment, the device 11 comprises a pipe 1A, which is essentially a straight pipe, rather than the curved design of FIGS. 1–3. Also depicted is an alternative design for the pipe mount 4A; this design includes an aperture 21 formed therethrough for attaching to the bicycle axle (see FIG. 1). In this design 11, the position control handle 8 is essentially unchanged, however, the cap 2A does have additional features, as shown below in FIG. 5. In some embodiments, the device 11 may include a tuning bolt 6A threaded through a threaded hole formed in the cap 2A; the tuning bolt 6A can be tightened and loosened such that its end presses against the reed 3 in varying strengths in order to change the tone of the reed 3 as it vibrates.

Figure 5:
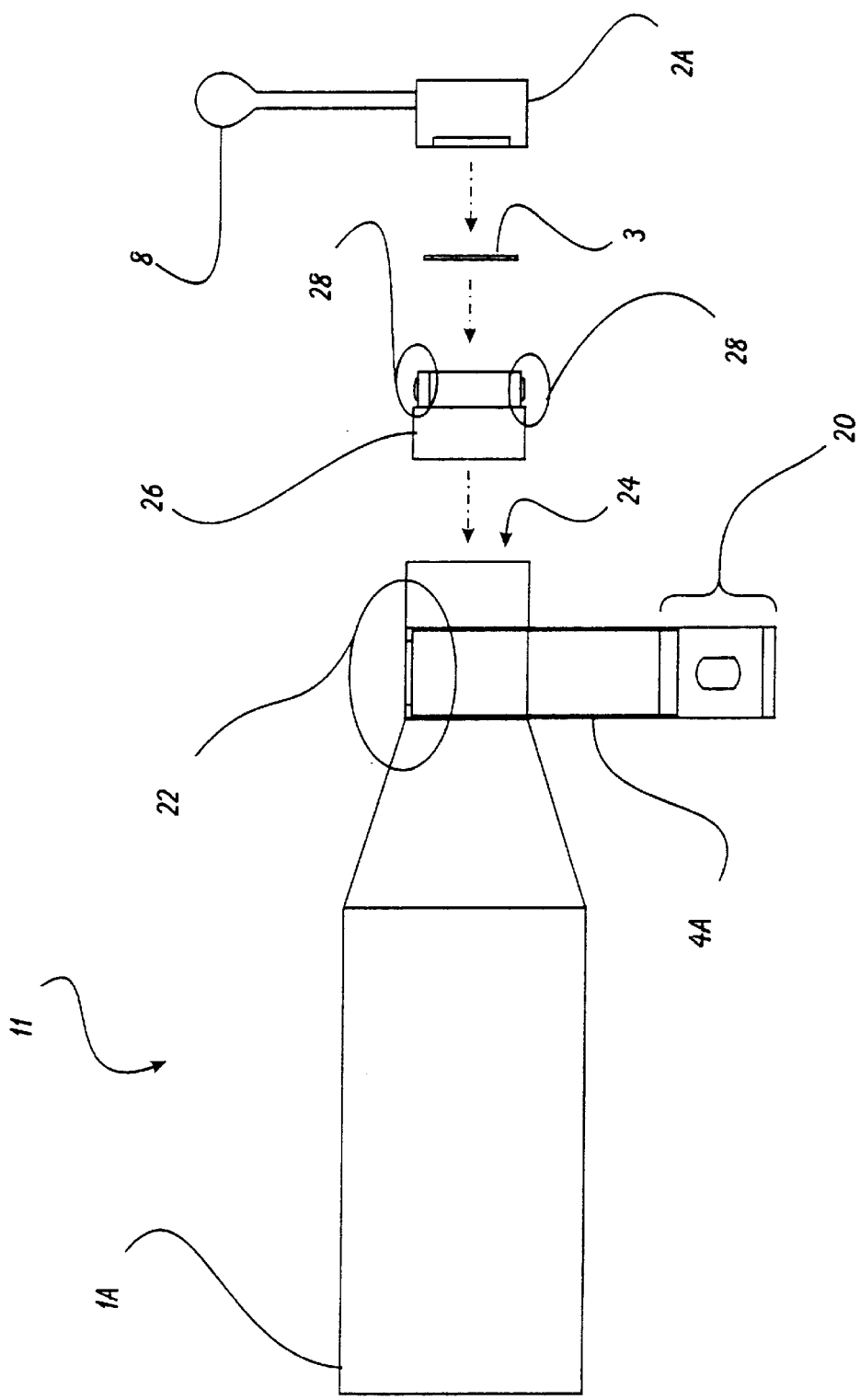
FIG. 5 is an exploded side view of the device of FIG. 4.

FIG. 5 is an exploded side view of the device 11 of FIG. 4. As depicted here, the alternate pipe mount 4A comprises a hub-engaging portion 20 (through which is formed the aperture of FIG. 4), and a frame-engaging portion 22. As should be intuitive, the hub-engaging portion 20 engages the bicycle's frame by attaching to the axle/hub of the rear wheel; the frame-engaging portion 22 is preferably a "saddle" shaped portion that cooperates with the substantially vertical portion of the rear bicycle frame (see FIG. 1). In this version, the device 11 is defined by a throat 24, into which is received an insert 26. The insert 26 is configured such that once it is inserted into the throat 24, it cannot be removed; it can however, rotate within the throat 24.

Figure 6:
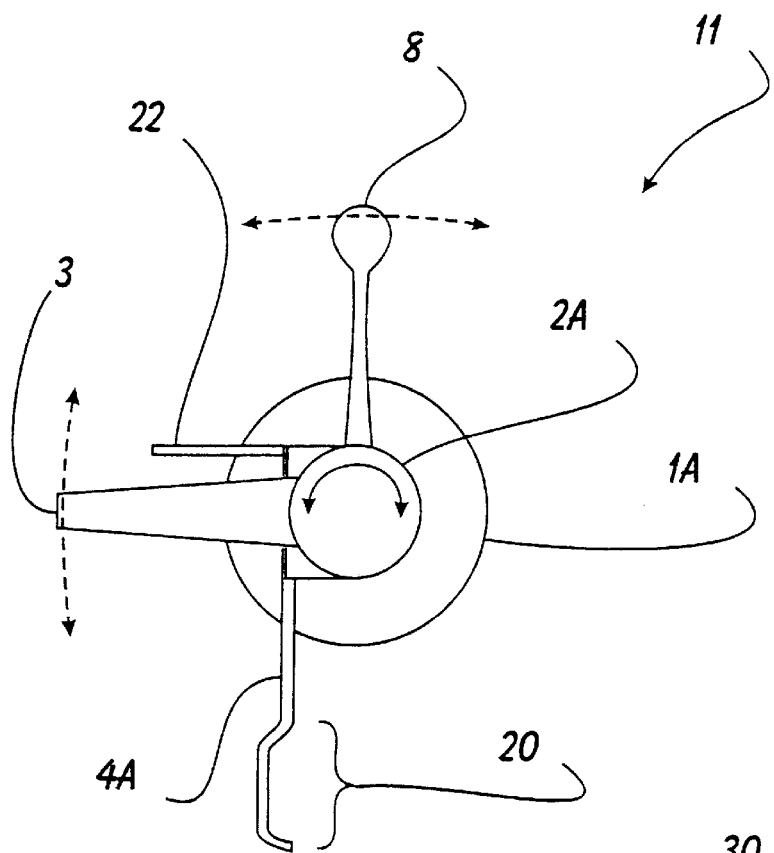
FIG. 6 is an end view of the device of FIGS. 4 and 5.

Also formed on the insert 26 are one or more protrusions 28. These protrusions 28 are formed to be cooperatively accepted into corresponding apertures within the cap 2A to hold the cap 2A and reed 3 to the insert 26 (see FIG. 7, below). When assembled, then (and as shown in FIGS. 4 and 6), the position control handle 8 can be cycled through an arc to engage and disengage the reed 3 from the bicycle's spokes. We can see a depiction of this travel by examining FIG. 6.

FIG. 6 is an end view of the device 11 of FIGS. 4 and 5. As shown, the position control handle 8 can be cycled through the arc depicted by dashed lines. In response, the cap 2A will rotate as shown by the arc, and finally, the reed 3 will be forced to travel along the dashed arc also. Further detail is also shown here regarding this new preferred design for the pipe mount 4A. As shown, the pipe mount 4A comprises a hub-engaging portion 20 configured to conform to the shape of the bicycle's frame. The pipe mount 4A further comprises a frame-engaging portion 22 that is essentially a saddle-shaped brace for resting against the bicycle's frame.

Figure 7:
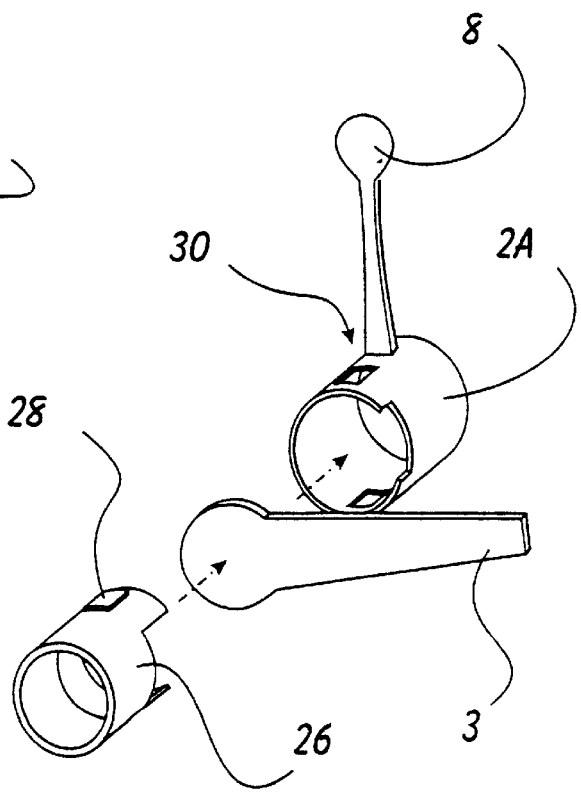
FIG. 7 is an exploded partial perspective view of the cap, reed and insert of the device of FIGS. 4–6.

Now turning to FIG. 7, we can examine the improvement in the cap assembly of this new design. FIG. 7 is an exploded partial perspective view of the cap 2A, reed 3 and insert 26 of the device of FIGS. 4–6. As shown, the cap 2A is formed with at least one aperture 30 formed therein to accept the protrusions 28 extending from the insert 26. Furthermore, the insert 26 and cap 2A are both formed with notches in them (not numbered) such that the elongated portion of the reed 3 can extend therethrough.

Figure 1:
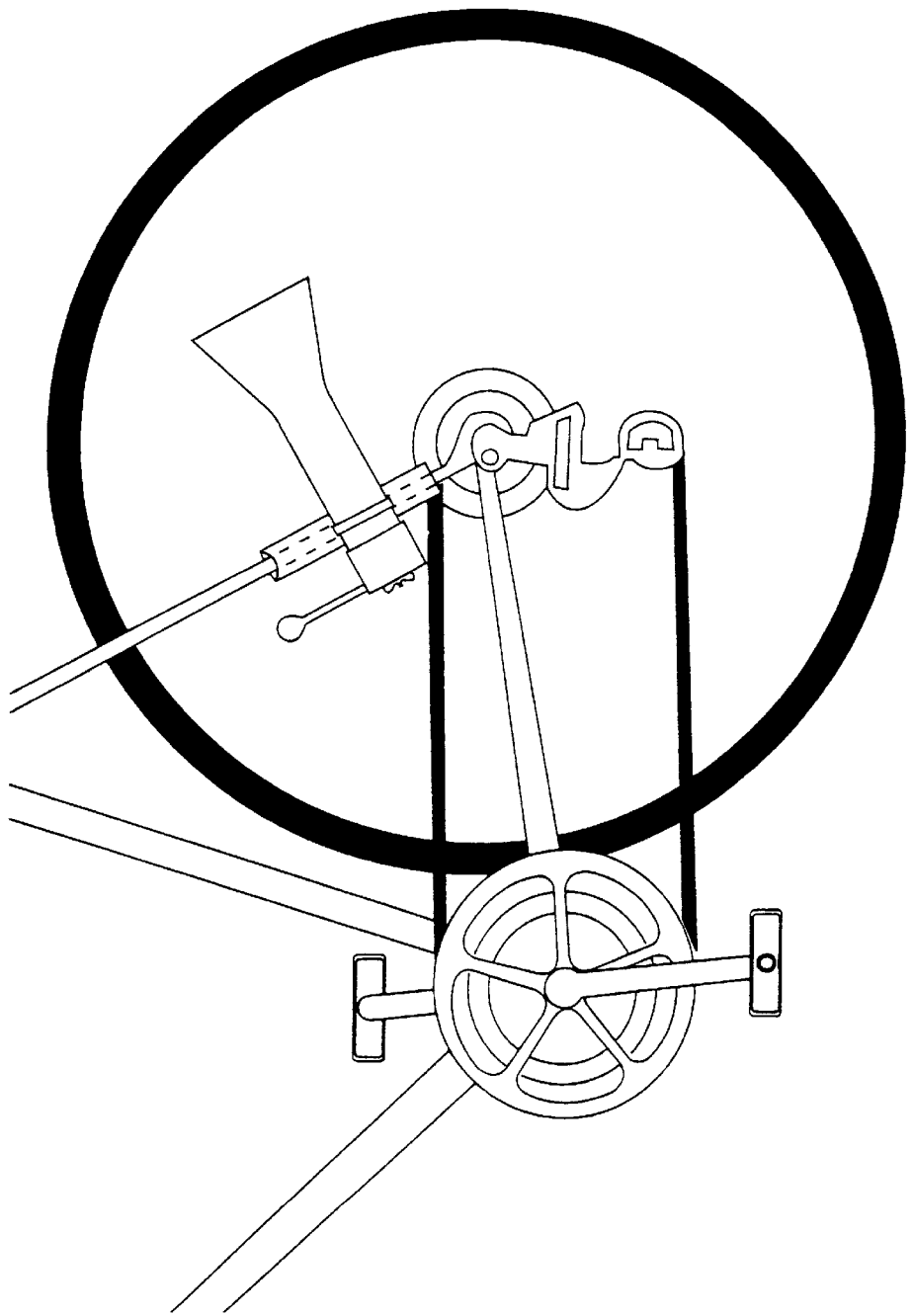
FIG. 1 is a side view of the rear wheel area of a bicycle with one preferred embodiment of the invention attached to it.

The change in the cap 2A and insert 26 design provides at least two benefits over the design of FIGS. 1–3: (1) the cap 2A can be easily removed by simply pressing in on the (spring-loaded or biasing) protrusions 28 (to disengage them from the apertures 30, and then pulling the cap 2A off; and (2) this design permits the entire device 11 to be constructed from molded plastic, thereby decreasing manufacturing cost without reducing the longevity of the device.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A noise-making device for attachment to a wheeled vehicle having at least one spoked wheel, said spoke wheel further defined by a wheel axle, the device comprising:

a pipe defined by a throat;

a pipe mount extending from said pipe for attaching to said wheeled vehicle in the vicinity of at least one of the spoked wheels;

an insert insertible into said throat;

a reed insertible into said insert, said reed configured to be oscillatable between a spoke-engaging position and a non-spoke-engaging position; and a cap defined by a position control handle extending therefrom, said cap configured to detachably attach to said insert.

2. The device of claim 1, wherein said pipe mount is further defined by a hub-engaging portion and a frame-engaging portion.

3. The device of claim 2, wherein said frame-engaging portion comprises a saddle-shaped brace.

4. The device of claim 3, wherein said frame-engaging portion comprises a substantially horizontal, saddle-shaped member.

5. The device of claim 2, wherein said hub-engaging portion comprises an aperture formed therethrough to accept the axle of the spoked wheel.

6. The device of claim 5, wherein said hub-engaging portion comprises a substantially vertical, substantially flat member.

7. The device of claim 1, wherein:

said insert is further defined by at least one protrusion formed therein; and said cap is further defined by at least one aperture formed therethrough, each said cap aperture formed to cooperatively accept one said protrusion.

8. The device of claim 7, wherein:

said insert comprises two said protrusions formed to extend from opposite sides of said insert; and said cap comprises two said apertures, each said aperture positioned to accept one said protrusion.

9. The device of claim 8, wherein said insert is permitted to rotate when inserted into said throat.

10. The device of claim 1, wherein said cap further includes a tuning bolt threadedly engaging an aperture formed in said cap whereby said tuning bolt can be adjusted to come into contact with said reed.

\* \* \* \* \*